United States Patent [19]

Knyszel et al.

[11] 3,802,739
[45] Apr. 9, 1974

[54] MUDFLAP FOR A REAR DUMP VEHICLE

[75] Inventors: Edward P. Knyszel, Parma; Josep O. Runci, Hudson, all of Ohio

[73] Assignee: General Motors Corporation, Detroit, Mich.

[22] Filed: Oct. 30, 1972

[21] Appl. No.: 302,238

[52] U.S. Cl. ............................ 298/1 SG, 280/154.5 R
[51] Int. Cl. ............................ B62b 9/16, B62b 25/16
[58] Field of Search ............ 298/1 SG; 280/154.5 R

[56] References Cited
UNITED STATES PATENTS

| | | | |
|---|---|---|---|
| 2,809,848 | 10/1957 | Carswell | 280/154.5 R |
| 2,203,710 | 8/1965 | Harting | 298/1 SG |
| 3,165,360 | 1/1965 | Saxton | 298/1 SG |

Primary Examiner—Richard J. Johnson
Attorney, Agent, or Firm—Edward J. Biskup

[57] ABSTRACT

A mudflap assembly for use with a dump vehicle having dual tires at the rear end thereof and including upper and lower plate sections having adjacent ends interconnected for relative pivotal movement about a first pivot axis. The upper plate section is connected to the dump body at the rear of the dual tires for pivotal movement about a second pivot axis and the arrangement is such that both plate sections are axially aligned in a vertical plane when the dump body is in a lowered position. A cable is connected to the plate sections at one end and has the other end fixed with the vehicle so that upon raising the dump body, the upper plate section rotates about the second pivot axis and draws the lower plate section closer to the dump body.

3 Claims, 5 Drawing Figures

PATENTED APR 9 1974

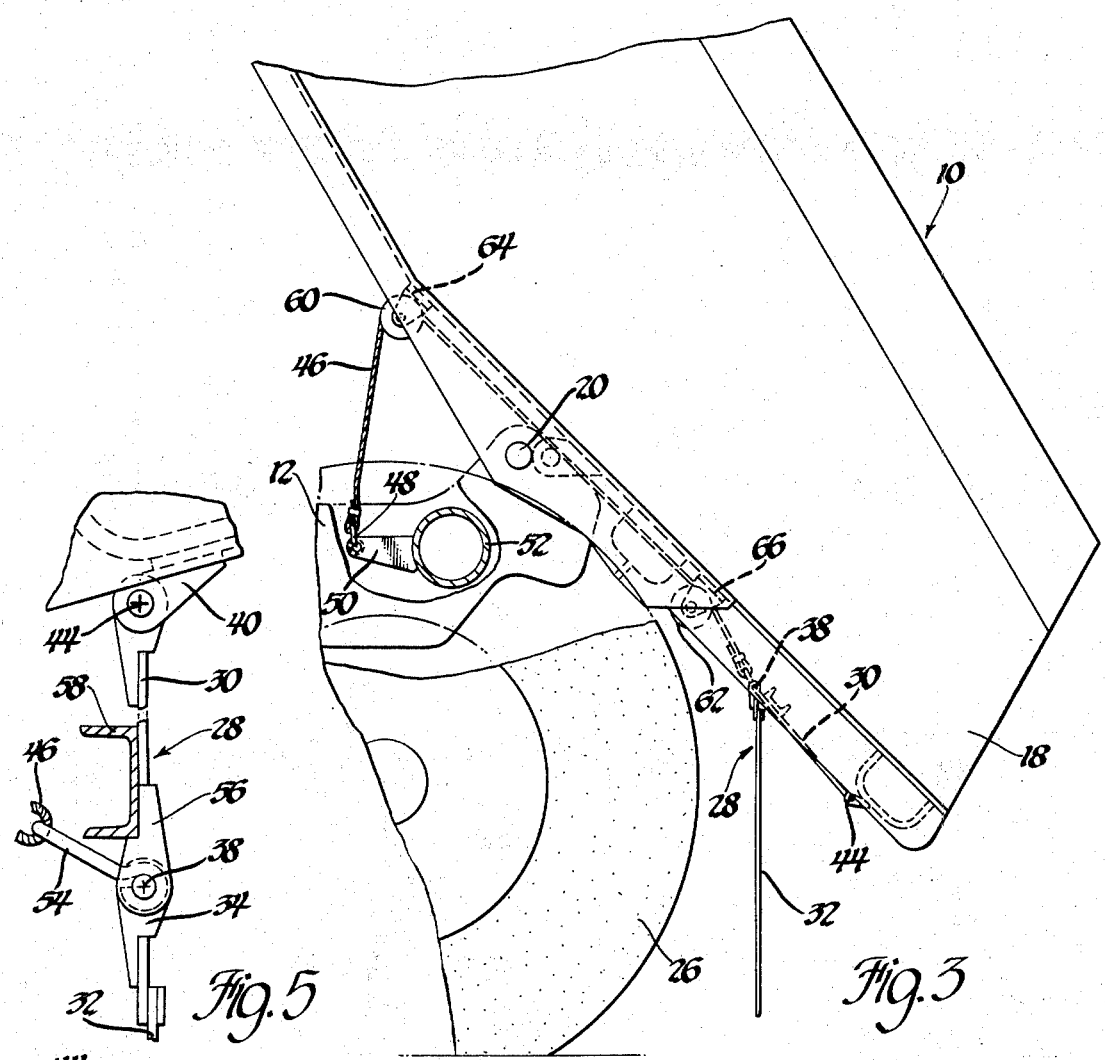
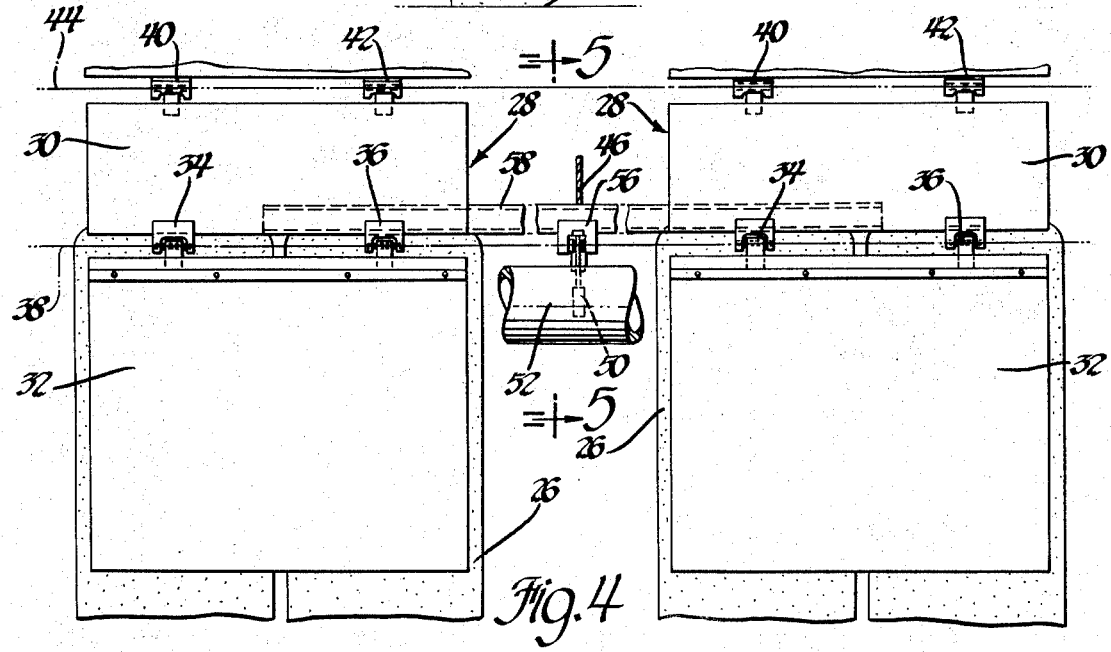

MUDFLAP FOR A REAR DUMP VEHICLE

This invention concerns a mudflap assembly for a vehicle and more particularly a mudflap construction which is attachable to the dump body of a dump vehicle.

In cases where mudflaps are connected to the material-retaining-body of a dump vehicle adjacent the rear wheels, it has been found that some form of retracting mechanism must be provided for preventing the mudflaps from contacting the ground when the dump body is moved to the raised position. Unless a retracting mechanism is used, the mudflaps become embedded in the dumped load or they may be lodged between the rear wheels and the ground and be torn from their supports when the vehicle is moved forwardly.

Accordingly, the objects of the present invention are to provide a mudflap assembly having two pivotally interconnected plate sections normally located in a vertical plane with one of the plate sections attached to the dump body and movable towards the latter to decrease the vertical length of the mudflap when the dump body is moved from a lowered position to a raised-dump-position; to provide a mudflap for the dump body of a dump vehicle in which the mudflap is made in two parts and one part of the mudflap is raised upwardly towards the dump body so as to shorten the length of the mudflap and thereby prevent the latter from contacting the ground when the dump body is raised to dump a load; to provide an operating mechanism having a flexible cable for rotating one part of a two-part mudflap towards a dump body when the latter is moved to a dumped position; and to provide a mudflap assembly for a dump body that includes two rigid plate sections that are pivotally interconnected with one plate section being foldable relative to the other for preventing the mudflap from engaging the ground when the dump body is raised.

The above objects and others are realized with a mudflap assembly comprising an upper plate section and a lower plate section having adjacent ends thereof interconnected for relative pivotal movement about a first pivot axis. The upper plate section is adapted to be connected to the dump body adjacent the rear tires for pivotal movement about a second pivot axis which is parallel to the first pivot axis so that both plate sections are axially aligned in a vertical plane when the dump body is in a lowered-carry-position. An actuator including a flexible cable has one end connected to the vehicle and the other end connected to the plate sections at a point located below the second pivot axis. In addition, means are carried by the dump body and cooperate with the cable so as to cause the horizontal distance between the ends of the cable to be shortened when the dump body is raised so that the upper section rotates about the second pivot axis and draws the lower section closer to the dump body so that the lower section does not contact the ground.

A more complete understanding of the invention will be derived from the following detailed description when taken with the drawings in which:

FIG. 3 is a view similar to FIG. 2 but shows the dump body in the raised-dumped-position;

FIG. 4 is an end view of the mudflap assembly taken on lines 4—4 of FIG. 2; and

FIG. 5 is an enlarged view taken on lines 5—5 of FIG. 4.

Figure 1:
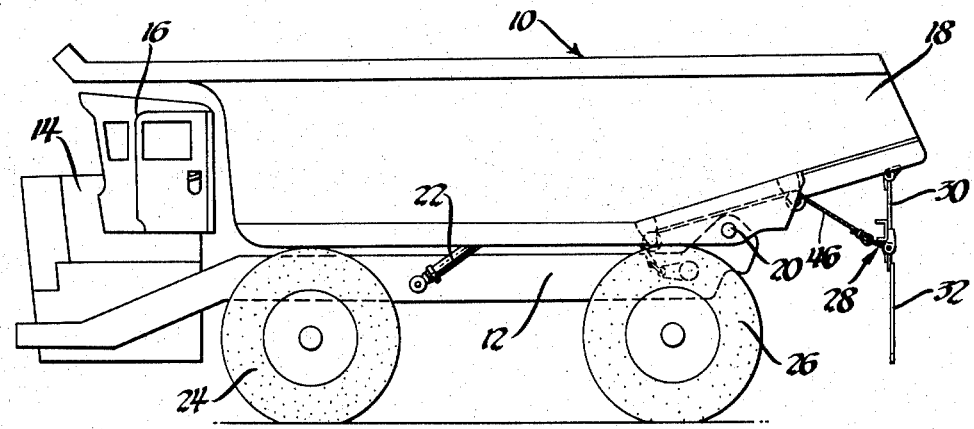
FIG. 1 is an elevational view showing a dump vehicle incorporating a mudflap assembly made according to the invention.
Figure 2:
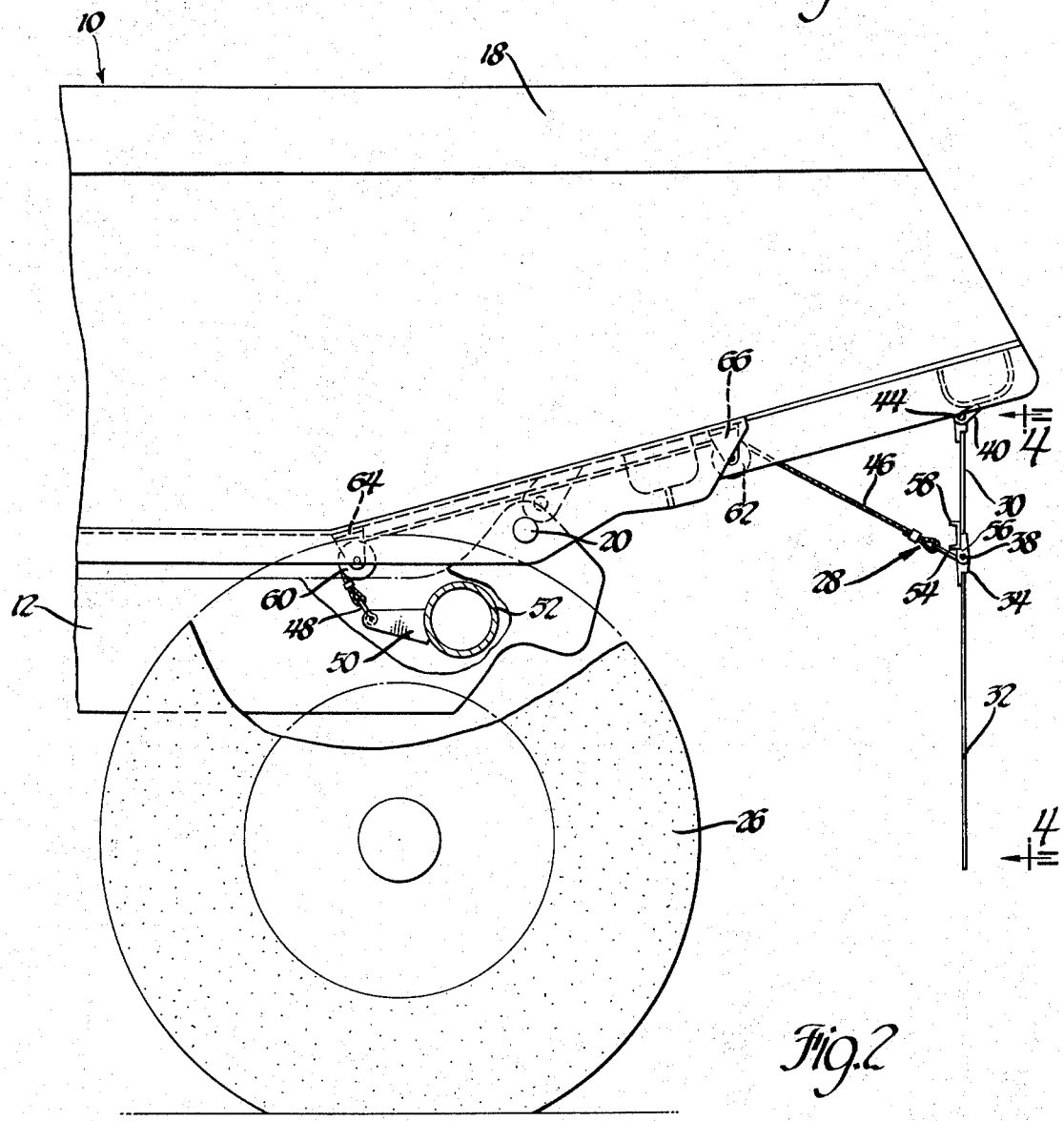
FIG. 2 is an enlarged view of the mudflap assembly shown in FIG. 1.

Referring to the drawings and more particularly FIGS. 1 and 2 thereof, an off-highway rear dump vehicle 10 is shown having a frame 12 the forward end of which is provided with the usual engine compartment 14 and an operator's cab 16. To the rear of the cab 16, the main part of the frame 12 supports a dump body 18 that is connected to the frame by a pivotal connection 20. As shown, the dump body 18 is in the lowered-carry-position and is adapted to be moved rearwardly about the pivotal connection 20 to a raised-dump-position shown in FIG. 3. The latter movement occurs by actuation of hydraulic means such as a multistage hydraulic cylinder shown in FIG. 1 and indicated by the reference numeral 22. It will be noted that the dump vehicle 10 has front steerable wheels 24 and also rear wheels 26. The rear wheels 26 are in the form of dual tires supported by a transverse axle and located on opposite sides of the frame 12 as shown in FIG. 4. In addition, a mudflap assembly 28 is carried by the rear portion of the dump body 18 and is supported by the latter to the rear of each set of dual tires.

More specifically, each mudflap assembly 28 comprises an upper plate section 30 and a lower plate section 32 with the adjacent ends thereof being interconnected for relative pivotal movement by a pair of hinged joints 34 and 36 which are axially aligned along a transverse horizontal axis indicated by the reference numeral 38. The upper plate section 30 is pivotally connected to the dump body 18 by a pair of hinged joints 40 and 42 which also are axially aligned along a transverse horizontal axis which is parallel to axis 38 and by the reference numeral 44. As seen in FIGS. 2 and 4, each plate section 30 and 32 is generally rectangular in configuration and is normally disposed in a vertical transverse plane when the dump body 18 is in the lowered-carry-position.

As should be apparent, a mudflap constructed and attached to a dump vehicle as described as above, would have the lower plate section contact the ground when the dump body is raised to dump a load. Accordingly as hereinbefore mentioned, it is important to have some form of retracting mechanism or actuator for moving the mudflap to a position which will assure that it will not be damaged during the dumping operation. To this end, the mudflap assembly 28 employed with the dump vehicle 10 includes an actuator which has a flexible cable 46. One end of the cable 46 is pivotally connected by an eye-link 48 to a bracket 50 rigid with a tubular structural member 52 which is part of the vehicle frame 12. The other end of the cable 46 is pivotally connected by an eye-link 54 to a bracket 56, which in turn, is fixed with a cross bar 58 that extends transversely and has the opposite ends rigidly secured to the lower portions of the upper plate sections 30 as seen in FIG. 4. It will be noted that the center of the pivotal connection provided by the eye-link 56 is located along the horizontal axis 38 in axial alignment with the hinged joints 34 and 36 interconnecting the upper plate section 30 with the lower plate section 32. It will also be noted that the intermediate part of the cable 46 is supported by a pair of rollers 60 and 62 which are rotatably mounted to the underside of the dump body by roller support brackets 64 and 66, respectively.

The operation of the mudflap assembly 28 described above is as follows: As alluded to hereinbefore, the dump body 18 is shown in the lowered-carry-position in FIGS. 1 and 2. At such time, the upper plate section 30 and the lower plate section 32 are located in a transversely extending plane and are vertically aligned with the horizontal axes 38 and 44 provided by the hinged joints 34, 36 and 40, 42. When the dump body 18 is moved by the multistage cylinder 22 from the lowered-carry-position to the raised-dump-position of FIG. 3, the upper plate section 30 rotates in a clockwise direction about the horizontal axis 44 and causes the hinged joints 34 and 36 and the lower plate section 32 to be raised towards the dump body 18 with the lower plate section still maintaining a vertical orientation. This occurs because the raising of the dump body 18 causes the roller 60 to move about an arc having the pivotal connection 20 as its center and thereby creating a drawing action on the cable 46. The drawing section in turn results in a shortening of the longitudinal distance between the opposite ends of the cable 46 which is allowed by the rotational movement of the upper plate section towards the dump body 18. It should be apparent that inasmuch as both of the mudflap assemblies 28 are interconnected by the cross bar 58, both mudflaps are simultaneously shortened in vertical length in the aforedescribed manner when the dump body 18 is raised.

Various changes and modifications can be made in this construction without departing from the spirit of the invention. Such changes and modifications are contemplated by the inventors and they do not wish to be limited except by the scope of the appended claims.

We claim:

1. A mudflap assembly for use with a dump vehicle having dual tires at the rear end thereof and a dump body supported adjacent said dual tires for movement between a lowered-carry-position and a raised-dump-position about an axis transverse to the longitudinal axis of the vehicle, said mudflap assembly comprising a first plate section and a second plate section having adjacent ends thereof interconnected for relative pivotal movement about a first pivot axis, one of said plate sections adapted to be connected to said dump body at the rear of said dual tires for pivotal movement about a second pivot axis which is parallel to said first pivot axis so that said plate sections are aligned in a vertical plane when the dump body is in the lowered-carry-position, an actuator including link means adapted to have one end connected to the vehicle and the other end connected to said plate sections at a point located below said second pivot axis, and means carried by said dump body and cooperating with said link means so as to cause the horizontal distance between the ends of the link means to be shortened when the dump body is moved from the lowered position to the raised position so that the other of said sections rotates about the second pivot axis and draws the lower section closer to the dump body while maintaining the lower section in a vertical plane.

2. In combination with a rear dump vehicle having dual tires and a dump body supported for movement between a lowered load retaining position and raised dump position, a mudflap comprising an upper section and a lower section pivotally interconnected along a first pivot axis which extends transversely to the longitudinal axis of the vehicle, means connecting the upper section to said dump body for pivotal movement about a second pivot axis which is parallel to said first pivot axis, said means being so located on said dump body whereby the upper and lower sections of said mudflap are normally positioned in a vertical plane to the rear of said dual tires, a cable having one end connected to the vehicle and the other end connected to said mudflap between said upper and lower sections, and means carried by said dump body and cooperating with said cable so as to cause the horizontal distance between the ends of the cable to shorten when the dump body is moved from the lowered position to the raised position so that the upper section rotates about the second pivot axis and draws the lower section closer to the dump body while maintaining the lower section in a vertical plane.

3. In combination with a rear dump vehicle having dual tires and a dump body supported for movement about a transverse horizontal axis between a lowered load retaining position and raised-dump-position, a mudflap comprising an upper section and a lower section pivotally interconnected along a first pivot axis parallel to said horizontal axis, means connecting the upper section to said dump body for pivotal movement about a second pivot axis which is parallel to said first pivot axis, said means being so located on said dump body whereby the upper and lower sections of said mudflap are normally positioned in a vertical plane to the rear of said dual tires, a cable having one end connected to the vehicle and the other end connected to said mudflap at a point horizontally aligned with said first pivot axis, and a pair of rollers carried by said dump body and cooperating with said cable so as to cause the horizontal distance between the ends of the cable to shorten when the dump body is moved from the lowered position to the raised position so that the upper section rotates about the second pivot axis and draws the lower section closer to the dump body while maintaining the lower section in a vertical plane.

* * * * *